Feb. 12, 1957 R. F. ENO 2,781,420

AMPLIFIER

Filed Aug. 21, 1953

INVENTOR.
ROBERT F. ENO
BY
William L. Lane
ATTORNEY 2,781,420

AMPLIFIER

Robert F. Eno, Long Beach, Calif., assignor to North American Aviation, Inc.

Application August 21, 1953, Serial No. 375,623

12 Claims. (Cl. 179—171)

This invention is an amplifier whose output reverses in polarity in accordance with the polarity of the input signal.

In amplifying varying D.-C. signals, various methods are employed, such as the direct coupled amplifier or chopping the D.-C. signal with a synchronous switch and then passing the chopped signal through a conventional A.-C. amplifier. These circuits require numerous elements and, in the case of the D.-C. amplifier, large grid bias voltages are required. Such a circuit is unstable over long periods of time due to changes in tubes and voltages; and stray capacitances prevent high-frequency response which may be desirable in a D.-C. amplifier to provide a short response time.

The advantages of the device of the invention are that its construction is simple and of few, low-cost, conventional elements. It will amplify D.-C. or A.-C. signals. A fixed bias is required, but neither tubes nor transformers are necessary. Amplification of low level signals is readily obtainable. The circuit utilizes modulation and demodulation of a carrier frequency. It has the desired quick response, and exhibits relatively little instability. Balancing and negative feedback, which may be necessary for stability in other amplifiers, is unnecessary in this device.

It is an object, therefore, of this invention to provide a simple, inexpensive amplifier.

It is another object of this invention to provide an amplifier of rugged construction which requires no tubes.

Another object is to provide a D.-C. amplifier that is relatively stable over long periods of time.

Still another object of the invention is to provide amplification with a minimum of circuit elements.

Further objects of invention will become apparent from the following description taken in connection with the accompanying drawings, in which.

Figure 1:
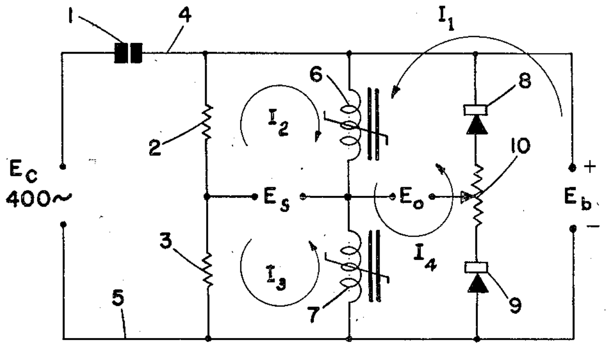
Fig. 1 is a schematic of the invention.

In Fig. 1, the carrier voltage $E_c$ is introduced into the circuit in series with blocking capacitor 1. Resistors 2 and 3 are connected in series across lines 4 and 5, as are series magnetic coils 6 and 7, presenting a high impedance input to the carrier voltage source. Also connected from line 4 to line 5 are diodes 8 and 9 in series with potentiometer 10 which is interposed between them. Both diodes are connected so as to conduct in the same direction through potentiometer 10.

An auxiliary bias $E_b$ causes current $I_1$ to flow in coils 6 and 7. Signal source $E_s$ causes signal current $I_2$ and $I_3$ to flow in a direction in which one bucks $I_1$ and the other reinforces $I_1$. If $E_s$ is alternating, $I_2$ and $I_3$ will likewise alternate, a different one will buck and a different one will reinforce current $I_1$. Coils 6 and 7 have saturable magnetic cores whose permeability varies inversely with the amount of current flowing in said coils. A magnetic alloy of nickel and iron such as Supermalloy is typical material of which such cores are constructed. As the permeability changes, the inductance of the coils changes and, consequently, the inductive reactance of each coil also changes. Inasmuch as the reactance of coil 6 varies with respect to the reactance of coil 7, depending on $E_s$, the voltage at their common connection will likewise vary in accordance with signal $E_s$ and in polarity with signal $E_s$. That is, the potential at the common connection of coils 6 and 7 will be the carrier voltage $E_c$ modulated in accordance with the signal $E_s$. Diodes 8 and 9 act as carrier-controlled switches and allow a flow of output current only on alternate half cycles of carrier voltage. These diodes are opened, or conducting, only at times when the carrier voltage biases them in the conducting direction. The output $E_o$ is a demodulated, half wave signal reversible in polarity. Demodulation of the output signal is obtained, of course, due to the rectifying action of the germanium diodes.

Potentiometer 10 having an adjustable wiper provides a means for adjusting the output to zero for an input zero signal. It is possible with this center adjustment to provide a constant D.-C. output superimposed with the amplified signal. In addition to the bias provided by $E_b$, the cores of coils 6 and 7 are also biased by reason of the circulating current $I_4$ which is unidirectional because of the diodes 8 and 9. This circuit may be designed so that this current aids or opposes the auxiliary, $E_b$. Reversal either of the $E_b$ potential or the direction of the diodes would accomplish this. Further adjustment of the strength of current $I_4$, in alternate embodiments, is obtained by changing the end-to-end resistance of potentiometer 10 from a substantial value down to an insignificant value, or by using other values of impedances in the paths of $I_2$ and $I_3$. In fact, the circuit may be operated with the circulating current $I_4$ being the sole bias, the auxiliary bias being eliminated.

The magnetic circuit may be operated linearly or nonlinearly in output versus input. The amount of bias current flowing in coils 6 and 7 determines which—large bias currents $I_1$ and $I_4$ place the operative position of the cores of coils 6 and 7 to include the nonlinear portion of their B—H curves. Low flux density in the cores will produce a signal output having good waveform and linearity over wide ranges of signal input. The nonlinear operation provides high voltage and power outputs as may be desired.

Figure 2:
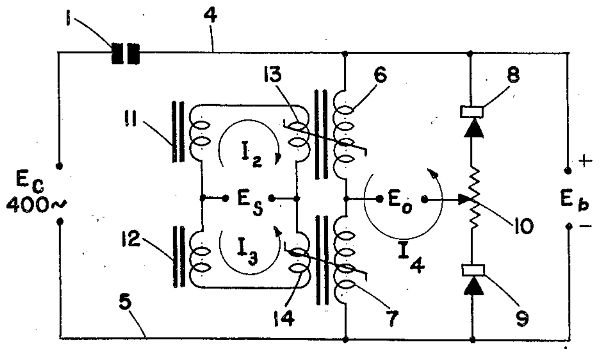
Fig. 2 is a low impedance input modification of Fig. 1.

In the case of a low impedance signal source, the circuit of Fig. 2 is used. Magnetic chokes 11 and 12 connected in series with control windings 13 and 14 provide the signal current path. Again, the unbalanced reactance of coils 6 and 7 is controlled by the signal currents $I_2$ and $I_3$. This circuit matches the low impedance of the signal source and high gain characteristics are retained.

Figure 3:
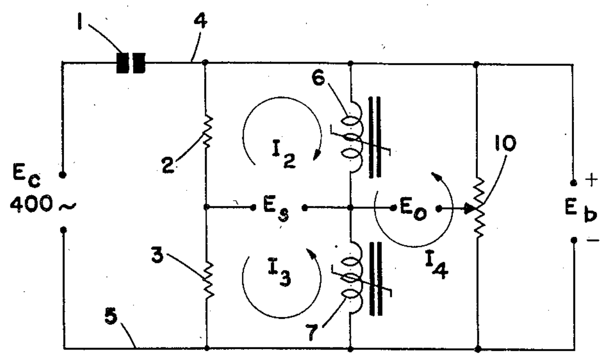
Fig. 3 is another modification of Fig. 1.

A modified form of the invention is that of Fig. 3 which is the same in construction as Fig. 1, with the exception that diodes 8 and 9 are removed. In this embodiment, modulation is accomplished, but by reason of removing the diodes, demodulation is not accomplished. The amplified output, $E_o$, is the carrier wave modulated by the signal wave.

Typical circuit parameters for this device are: capacitance 1, 25 microfarads; resistors 2 and 3, 10,000 ohms each; diodes 8 and 9 may be germanium IN55's; potentiometer 10, 500 ohms; and coils 6 and 7, 1,000 turns of No. 35 wire on a Supermalloy tape wound core of 2 inches median length and .0156 square inch cross-section area. Adjusting the bias current $I_1$ to approximately 400 microamperes and current $I_4$ to approximately 240 microamperes places the operation of the modulator in linearity. Bias currents on the order of 10 or 20 milliamperes result in nonlinear output.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In an amplifier, a first current path comprising two series-connected coils each having a magnetic core, a second current path in parallel with said first current path comprising a potentiometer in series with similarly directed, carrier operated diodes, means providing a flow of carrier current through said parallel current paths, and means for coupling a signal voltage to said coils whereby their reactance is changed in accordance with the flow of signal current therethrough, the wiper of said potentiometer and the common connection of said coils forming the output terminals of said amplifier.

2. The combination recited in claim 1 wherein the cores of said coils are saturable.

3. In an amplifier, a first current path comprising two series-connected impedances, a second current path comprising two series-connected coils each having a magnetic core, and a third current path comprising similarly directed diodes, said current paths connected in parallel, the common connection of said impedances and the common connection of said coils forming the signal input terminals to said amplifier and the common connection of said coils and a point intermediate said diodes forming the output terminals of said amplifier.

4. The combination recited in claim 3 wherein the cores of said coils are of high permeability nickel-iron alloy.

5. The combination recited in claim 3 wherein said two series-connected impedances are resistors.

6. In an amplifier, a first current path comprising two series-connected impedances, a second current path comprising two series-connected coils each having a magnetic core, and a third current path comprising a potentiometer connected in circuit intermediate similarly directed diodes, said paths connected in parallel, the common connection of said impedances and the common connection of said coils forming the signal input terminals of said amplifier and the common connection of said coils and the wiper of said potentiometer forming the output terminals of said amplifier.

7. In an amplifier, a first current path comprising two series-connected impedances, a second current path comprising two series-connected coils each having a magnetic core, a third current path comprising a potentiometer interposed between similarly directed diodes, said paths connected in parallel, means for coupling a carrier frequency source to said parallel paths, means for coupling a signal voltage to said coils, and means for coupling a bias voltage to said coils, the wiper of said potentiometer and the common connection of said coils forming the output terminals of said amplifier.

8. In combination, three parallel current paths, a first path comprising two series-connected resistors, a second path comprising two series-connected coils each having a magnetic core, a third path comprising a potentiometer, means for coupling a carrier frequency source to said parallel paths, means for connecting a signal source between the common connection of said resistor and the common connection of said coils, and means for providing a D.-C. bias for said coils, the wiper of said potentiometer and the common connection of said coils forming output terminals.

9. In an electronic device, two parallel current paths, a first path comprising two series-connected coils each having a magnetic core, a second path comprising a potentiometer in series with similarly directed, carrier operated diodes, a carrier current source connected to operate said diodes, a control winding disposed on each coil, said windings connected in series, and two magnetic chokes connected in series with said control windings, the common connection of said coils and the wiper of said potentiometer forming the output terminals of said electronic device.

10. The combination recited in claim 9 wherein is included means for coupling a carrier voltage to said parallel paths, and means for coupling a signal to said magnetic chokes and said control windings.

11. In combination, a first current path comprising two series-connected coils each having a magnetic core, a second current path in parallel with said first current path comprising a potentiometer whose wiper provides one output terminal and the common connection of said coils provides the other output terminal, means for coupling a carrier frequency source to said parallel paths, means for coupling a signal voltage to said coils whereby their reactance is changed in accordance with the flow of signal current therethrough.

12. The combination recited in claim 11 wherein is included D.-C. bias means for biasing said coils.

References Cited in the file of this patent

UNITED STATES PATENTS

| | | |
|---|---|---|
| 2,164,383 | Burton | July 4, 1939 |
| 2,289,564 | Wrathall | July 14, 1942 |
| 2,472,980 | Miller et al. | June 14, 1949 |
| 2,509,738 | Lord | May 30, 1950 |